United States Patent
Frache et al.

(10) Patent No.: US 12,469,872 B2
(45) Date of Patent: Nov. 11, 2025

(54) FLUOROPOLYMER HYBRID COMPOSITE

(71) Applicants: SYENSQO SA, Brussels (BE); POLITECNICO DI TORINO, Turin (IT)

(72) Inventors: Alberto Frache, Alessandria (IT); Silvia Santangeletta, Alluvioni Piovera (IT); Daniele Battegazzore, Alessandria (IT); Julio A. Abusleme, Saronno (IT); Christine Hamon, Bollate (IT); Giambattista Besana, Mariano Comense (IT); Sëgolène Brusseau, Tavaux (FR)

(73) Assignees: SYENSQO SA, Brussels (BE); Politecnico di Torino, Turin (IT)

( * ) Notice: Subject to any disclaimer, the term of this patent is extended or adjusted under 35 U.S.C. 154(b) by 837 days.

(21) Appl. No.: 17/297,028

(22) PCT Filed: Dec. 16, 2019

(86) PCT No.: PCT/EP2019/085246
§ 371 (c)(1),
(2) Date: May 26, 2021

(87) PCT Pub. No.: WO2020/126975
PCT Pub. Date: Jun. 25, 2020

(65) Prior Publication Data
US 2021/0408574 A1 Dec. 30, 2021

(30) Foreign Application Priority Data
Dec. 17, 2018 (EP) ..................................... 18306704

(51) Int. Cl.
*H01M 10/056* (2010.01)

(52) U.S. Cl.
CPC .. *H01M 10/056* (2013.01); *H01M 2300/0091* (2013.01)

(58) Field of Classification Search
CPC ....... H01M 10/056; H01M 2300/0091; H01M 2300/0085; H01M 14/005; H01M 10/0565; H01M 2300/0045; H01M 2300/0082; Y02E 60/10; H01G 11/56
See application file for complete search history.

(56) References Cited

U.S. PATENT DOCUMENTS

2015/0140473 A1  5/2015  Abusleme et al.

FOREIGN PATENT DOCUMENTS

| WO | 2011121078 A1 | 10/2011 |
| WO | 2013160240 A1 | 10/2013 |
| WO | 2014067816 A1 | 5/2014 |
| WO | 2017085101 A1 | 5/2017 |
| WO | 2018206612 A1 | 11/2018 |

*Primary Examiner* — Helen Oi K Conley
(74) *Attorney, Agent, or Firm* — Osha Bergman Watanabe & Burton LLP

(57) ABSTRACT

The invention pertains to a process for the manufacture of a polymer electrolyte based on a fluoropolymer hybrid organic/inorganic composite, to a polymer electrolyte obtained thereof and to uses of said polymer electrolyte and membranes obtained therefrom in various applications, especially in electrochemical and in photo-electrochemical applications.

16 Claims, No Drawings

FLUOROPOLYMER HYBRID COMPOSITE

CROSS-REFERENCE TO RELATED APPLICATIONS

This application is a U.S. national stage entry under 35 U.S.C. § 371 of International Application No. PCT/EP2019/085246 filed Dec. 16, 2019, which claims priority to European patent application No. 18306704.0, filed on Dec. 17, 2018. The entire contents of these applications are explicitly incorporated herein by this reference.

TECHNICAL FIELD

The invention pertains to a process for the manufacture of a polymer electrolyte based on a fluoropolymer hybrid organic/inorganic composite, to a polymer electrolyte obtained thereof and to uses of said polymer electrolyte and membranes obtained therefrom in various applications, especially in electrochemical and in photo-electrochemical applications.

BACKGROUND ART

Organic-inorganic polymer hybrids wherein inorganic solids on a nano or molecular level are dispersed in organic polymers have raised a great deal of scientific, technological and industrial interests because of their unique properties.

To elaborate organic-inorganic polymer hybrid composites, a sol-gel process using metal alkoxides is the most useful and important approach.

By properly controlling the reaction conditions of hydrolysis and polycondensation of metal alkoxydes, in particular of alkoxysilanes (e.g. tetramethoxysilane (TMOS) or tetraethoxysilane (TEOS)), in the presence of pre-formed organic polymers, it is possible to obtain hybrids with improved properties compared to the original compounds. The polymer can enhance the toughness and processability of otherwise brittle inorganic materials, wherein the inorganic network can enhance scratch resistance, mechanical properties and surface characteristics of said hybrids.

Hybrids made from sol-gel technique starting from fluoropolymers, in particular from vinylidene fluoride polymers are known in the art.

For instance, WO 2011/121078 discloses a process for the manufacture of fluoropolymer hybrid organic-inorganic composites wherein at least a fraction of hydroxyl groups of a fluoropolymer are reacted in solution or in molten state with at least a fraction of hydrolysable groups of a metal compound of formula $X_{4-m}AY_m$ (X is a hydrocarbon group, Y is a hydrolysable group, A is a metal selected from Si, Ti and Zr, m is an integer from 1 to 4). This patent document also mentions that films made of the said hybrid organic/inorganic composites are then swelled with an electrolyte solution comprising a solvent (mixture of ethylene carbonate and propylene carbonate) and an electrolyte ($LiPF_6$). Nevertheless, once the film has been casted, swelling it again with an electrolyte solution is not an easy task, so that final amount of electrolyte solution actually interpenetrated in the separator is relatively low, so as, consequently, the ionic conductivity.

Facing said drawback, WO 2013/160240 discloses the manufacture of the fluoropolymer hybrid organic/inorganic composite in the presence of a liquid medium, to provide a self-standing fluoropolymer film stably comprising and retaining said liquid medium and having outstanding ionic conductivity. When the hybrid organic/inorganic composite is for use as polymer electrolyte separator in electrochemical and photo-electrochemical devices, it may be obtained by a process comprising hydrolysing and/or polycondensing a mixture comprising a fluoropolymer, a metal compound of formula $X_{4-m}AY_m$, an ionic liquid, a solvent, and one electrolytic salt. The resulting liquid mixture is then processed into a film by casting.

Unfortunately, preparing films by casting technique requires the use of organic solvents like NMP, DMA and similar which are undesirable in an industrial production processes.

WO 2014/067816 discloses a process for preparing fluoropolymer hybrid organic/inorganic composites by a process that comprises forming an aqueous solution of a pre-gelled metal compound and reacting the same with a functional fluoropolymer. The composite is typically obtained in the form of pellets, which can be processed into a film by extrusion or compression techniques.

One drawback of the fluoropolymer films obtained according to this method is that the distribution of atomic elements in the film is not homogeneous.

The Applicants have now surprisingly found that it is possible to manufacture polymer electrolytes exhibiting outstanding ionic conductivity based on a hybrid organic/inorganic composite, and that said polymer electrolytes can be suitably processed into films having an improved atomic homogeneity by a process that does not include casting with a solvent, with the further advantage of avoiding the use and the subsequent recovery and disposal of said solvent.

SUMMARY OF INVENTION

It is thus an object of the present invention a process for manufacturing a polymer electrolyte based on a fluoropolymer hybrid organic/inorganic composite, said process comprising the following steps:

(i) providing a composition comprising a pre-gelled metal compound [compound (P-GM)] obtained by partially hydrolysing and/or polycondensing a metal compound [compound (M)] having formula:

$$X_{4-m}AY_m$$

wherein m is an integer from 1 to 4, A is a metal selected from the group consisting of Si, Ti and Zr, Y is a hydrolysable group selected from the group consisting of an alkoxy group, an acyloxy group and a hydroxyl group, X is a hydrocarbon group, optionally comprising one or more functional groups;

in the presence of:
an electrolyte solution [solution (ES)] comprising at least one metal salt [metal salt (S)] and a liquid medium [medium (L)];
at least one acid catalyst; and
optionally, an aqueous medium [medium (A)]; said pre-gelled metal compound [compound (P-GM)] comprising one or more inorganic domains consisting of ≡A-O-A≡ bonds and one or more residual hydrolysable groups Y; and then (ii) reacting in the molten state at least a fraction of hydroxyl groups of a functional fluoropolymer comprising at least one hydroxyl group [polymer (F)] with at least a fraction of hydrolysable groups Y of said compound (P-GM), so as to obtain a polymer electrolyte comprising a fluoropolymer hybrid organic/inorganic composite incorporating the electrolyte solution (ES).

In a second object, the present invention provides a composition comprising the pre-gelled metal compound [compound (P-GM)], said composition being obtained according to step (i) of the process as defined above.

In a third object, the present invention pertains to a process for the manufacture of a membrane for an electrochemical device comprising processing the polymer electrolyte obtained by the process of the invention through compression moulding or extrusion techniques.

A further object of the present invention is thus a polymer electrolyte membrane which can be obtained by the process as defined above.

It has been found that the polymer electrolyte membrane of the present invention, despite being obtained by a process that does not include casting a solution of the polymer in a solvent, is endowed with high conductivity and homogeneity of the atomic distribution throughout its structure, thus avoiding the marked variations in surface composition and creating predictable and efficient ion transport pathways.

DESCRIPTION OF EMBODIMENTS

By the term "pre-gelled metal compound (P-GM)", it is hereby intended to denote a metal compound (M) that has been subjected to partial hydrolysis and/or polycondensation in the presence of an electrolyte solution and an acid catalyst that can be gelled when reacted with a functional fluoropolymer comprising at least one hydroxyl group, to provide a polymer electrolyte.

The metal compound (M) [compound (M)] of formula $X_{4-m}AY_m$ can comprise one or more functional groups on any of groups X and Y, preferably on at least one group X.

In case compound (M) comprises at least one functional group, it will be designated as functional compound (M); in case none of groups X and Y comprises a functional group, compound (M) will be designated as non-functional compound (M).

Functional compounds (M) can advantageously provide for a fluoropolymer hybrid organic/inorganic composite having functional groups, thus further modifying the chemistry and the properties of the hybrid composite over native polymer (F) and native inorganic phase.

As non-limitative examples of functional groups, mention can be made of epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

To the aim of obtaining a polymer electrolyte based on fluoropolymer hybrid organic/inorganic composites having functional groups, it is generally preferred that any of groups X of compound (M) of formula $X_{4-m}AY_m$ comprises one or more functional groups and that m is an integer of 1 to 3, so that advantageously each A atom, after complete hydrolysis and/or polycondensation in step (i) of the process, will nevertheless be bound to a group comprising a functional group.

Preferably, X in compound (M) is selected from $C_1$-$C_{18}$ hydrocarbon groups, optionally comprising one or more functional groups. More preferably, X in compound (M) is a $C_1$-$C_{12}$ hydrocarbon group, optionally comprising one or more functional group.

With the aim of manufacturing a polymer electrolyte based on a fluoropolymer hybrid organic/inorganic composites which can exhibit functional behaviour in terms of hydrophilicity or ionic conductivity, functional group of compound (M) will be preferably selected among carboxylic acid group (in its acid, anhydride, salt or halide form), sulfonic group (in its acid, salt or halide form), phosphoric acid group (in its acid, salt, or halide form), amine group, and quaternary ammonium group; most preferred will be carboxylic acid group (in its acid, anhydride, salt or halide form) and sulphonic group (in its acid, salt or halide form).

The selection of the hydrolysable group Y of the compound (M) is not particularly limited, provided that it enables in appropriate conditions the formation of a —O-A≡ bond; said hydrolysable group can be notably a halogen (especially a chlorine atom), a hydrocarboxy group, a acyloxy group or a hydroxyl group.

Examples of functional compounds (M) are notably vinyltriethoxysilane, vinyltrimethoxysilane, vinyltrismethoxyethoxysilane of formula $CH_2$=$CHSKOC_2H_4OCH_3)_3$, 2-(3,4-epoxycyclohexylethyltrimethoxysilane) of formula:

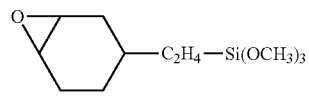

glycidoxypropylmethyldiethoxysilane of formula:

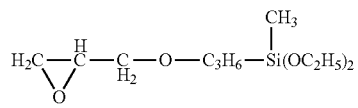

glycidoxypropyltrimethoxysilane of formula:

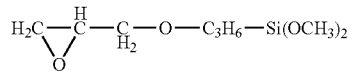

methacryloxypropyltrimethoxysilane of formula:

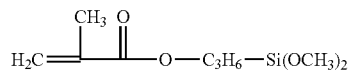

aminoethylaminpropylmethyldimethoxysilane of formula:

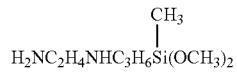

aminoethylaminpropyltrimethoxysilane of formula:

$H_2NC_2H_4NHC_3H_6Si(OCH_3)_3$ 3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldimethoxysilane, 3-(n-allylamino)propyltrimethoxysilane, 2-(4-chlorosulfonylphenyl)ethyltrimethoxysilane, carboxyethylsilanetriol, and its sodium salts, triethoxysilylpropylmaleamic acid of formula:

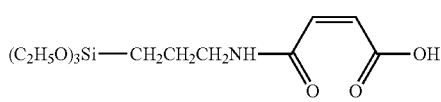

3-(trihydroxysilyl)-1-propane-sulphonic acid of formula $HOSO_2—CH_2CH_2CH_2—Si(OH)_3$, N-(trimethoxysilylpropyl)ethylene-diamine triacetic acid, and its sodium salts, 3-(triethoxysilyl)propylsuccinic anhydride of formula:

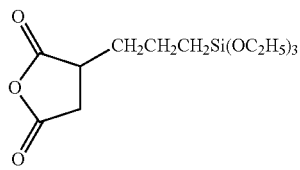

acetamidopropyltrimethoxysilane of formula $H_3C—C(O)NH—CH_2CH_2CH_2—Si(OCH_3)_3$, alkanolamine titanates of formula $Ti(A)_x(OR)_y$, wherein A is an amine-substituted alkoxy group, e.g. $OCH_2CH_2NH_2$, R is an alkyl group, and x and y are integers such that x+y=4.

Examples of non-functional compounds (M) are notably triethoxysilane, trimethoxysilane, tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

By the term "metal salt (S)", it is hereby intended to denote a metal salt comprising electrically conductive ions.

A variety of metal salts may be employed as metal salts (S). Metal salts which are stable and soluble in the chosen liquid medium (L) are generally used.

Non-limitative examples of suitable metal salts (S) include, notably, MeI, $Me(PF_6)_n$, $Me(BF_4)_n$, $Me(ClO_4)_n$, $Me(bis(oxalato)borate)_n$ ("$Me(BOB)_n$"), $MeCF_3SO_3$, $Me[N(CF_3SO_2)_2]_n$, $Me[N(C_2F_5SO_2)_2]_n$, $Me[N(CF_3SO_2)(R_FSO_2)]_n$ with $R_F$ being $C_2F_5$, $C_4F_9$, $CF_3OCF_2CF_2$, $Me(AsF_6)_n$, $Me[C(CF_3SO_2)_3]_n$, $Me_2S_n$, wherein Me is a metal, preferably a transition metal, an alkaline metal or an alkaline-earth metal, more preferably Me being Li, Na, K, Cs, and n is the valence of said metal, typically n being 1 or 2.

Preferred metal salts (S) are selected from the followings: LiI, $LiPF_6$, $LiBF_4$, $LiClO_4$, lithium bis(oxalato)borate ("LiBOB"), $LiCF_3SO_3$, $LiN(CF_3SO_2)_2$ ("LiTFSI"), $LiN(C_2F_5SO_2)_2$, $M[N(CF_3SO_2)(RFSO_2)]_n$ with $R_F$ being $C_2F_5$, $C_4F_9$, $CF_3OCF_2CF_2$, $LiAsF_6$, $LiC(CF_3SO_2)_3$, $Li_2S_n$ and combinations thereof.

The medium (L) in the electrolyte solution (ES) typically comprises, preferably consists of, at least one ionic liquid (IL). For the purpose of the present invention, the term "ionic liquid" is intended to denote a compound formed by the combination of a positively charged cation and a negatively charged anion in the liquid state at temperatures below 100° C. under atmospheric pressure.

The ionic liquid (IL) is typically selected from protic ionic liquid ($IL_p$) and aprotic ionic liquids ($IL_a$).

By the term "protic ionic liquid ($IL_p$)", it is hereby intended to denote an ionic liquid wherein the cation comprises one or more H+ hydrogen ions.

Non-limitative examples of cations comprising one or more H+ hydrogen ions include, notably, imidazolium, pyridinium, pyrrolidinium or piperidinium rings, wherein the nitrogen atom carrying the positive charge is bound to a H+ hydrogen ion.

By the term "aprotic ionic liquid ($IL_a$)", it is hereby intended to denote an ionic liquid wherein the cation is free of H+ hydrogen ions.

The liquid medium typically consists essentially of at least one ionic liquid (IL) and, optionally, at least one additive (A), wherein said ionic liquid (IL) is selected from protic ionic liquids ($IL_p$), aprotic ionic liquids ($IL_a$) and mixtures thereof.

The ionic liquid (IL) is typically selected from those comprising as cation a sulfonium ion or an imidazolium, pyridinium, pyrrolidinium or piperidinium ring, said ring being optionally substituted on the nitrogen atom, in particular by one or more alkyl groups with 1 to 8 carbon atoms, and on the carbon atoms, in particular by one or more alkyl groups with 1 to 30 carbon atoms.

Within the meaning of the present invention, by the term "alkyl group" it is meant saturated hydrocarbon chains or those carrying one or more double bonds and containing 1 to 30 carbon atoms, advantageously 1 to 18 carbon atoms and even more advantageously 1 to 8 carbon atoms. There can be mentioned by way of example the methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups.

In an advantageous embodiment of the present invention, the cation of the ionic liquid (IL) is selected from the followings:

a pyrrolidinium ring of formula (III) here below:

(III)

wherein $R_1$ and $R_2$ each represent independently an alkyl group with 1 to 8 carbon atoms and $R_3$, $R_4$, $R_5$ and $R_6$ each represent independently a hydrogen atom or an alkyl group with 1 to 30 carbon atoms, advantageously 1 to 18 carbon atoms, also more advantageously 1 to 8 carbon atoms, and a piperidinium ring of formula (IV) here below:

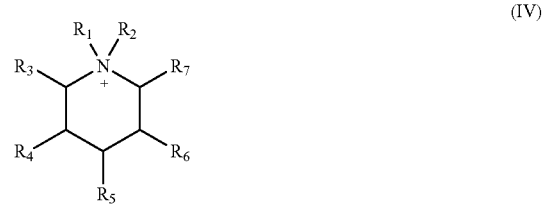

(IV)

wherein $R_1$ and $R_2$ each represent independently of each other an alkyl group with 1 to 8 carbon atoms and $R_3$ to $R_7$ each represent independently of each other a hydrogen atom or an alkyl group with 1 to 30 carbon atoms, advantageously 1 to 18 carbon atoms, even more advantageously 1 to 8 carbon atoms.

In a particularly advantageous embodiment of the present invention, the cation of the ionic liquid (IL) is selected from the followings:

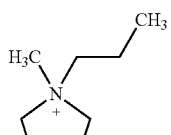

(III-a)

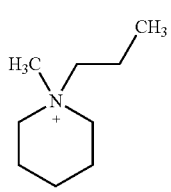

(IV-a)

The ionic liquid (IL) is advantageously selected from those comprising as anion those chosen from halides anions, perfluorinated anions and borates.

The halide anions are in particular selected from the following anions: chloride, bromide, fluoride or iodide.

In a particularly advantageous embodiment of the present invention, the anion of the ionic liquid (IL) is selected from the followings:
  bis(trifluoromethylsulphonyl)imide of formula $(SO_2CF_3)_2N^-$,
  hexafluorophosphate of formula $PF_6^-$,
  tetrafluoroborate of formula $BF_4$, and
  oxaloborate of formula:

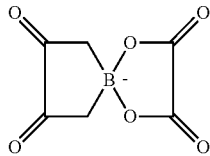

The medium (L) in the electrolyte solution (ES) may further comprise one or more additives.

Should one or more additives be present in the liquid medium, non-limitative examples of suitable additives include, notably, those which are soluble in the liquid medium.

In a preferred embodiment, electrolyte solution (ES) consists of LiTFSI and at least one ionic liquid (IL).

The concentration of LiTFSI in the medium (L) of the electrolyte solution (ES) is advantageously at least 0.01 M, preferably at least 0.025 M, more preferably at least 0.05 M.

The concentration of LiTFSI in the medium (L) of the electrolyte solution (ES) is advantageously at most 3 M, preferably at most 2 M, more preferably at most 1 M.

The selection of the acid catalyst is not particularly limited. The acid catalyst is typically selected from the group consisting of organic and inorganic acids.

The acid catalyst is preferably selected from the group consisting of organic acids.

Very good results have been obtained with citric acid and with formic acid.

One skilled in the art will recognize that the amount of the acid catalyst used in step (i) strongly depends on the nature the acid catalyst itself.

The amount of the acid catalyst used in step (i) of the process of the invention may thus be advantageously of at least 0.1% by weight based on the total weight of the metal compound (M).

The amount of the acid catalyst used in step (i) of the process of the invention is advantageously of at most 40% by weight, preferably of at most 30% by weight based on the total weight of the metal compound (M).

In step (i) of the process of the invention, the metal compound (M) may optionally be partially hydrolysed and/or polycondensed in the presence of an aqueous medium [medium (A)].

By the term "aqueous medium", it is hereby intended to denote a liquid medium comprising water which is in the liquid state at 20° C. under atmospheric pressure.

The aqueous medium (A) more preferably consists of water and one or more alcohols. The alcohol included in medium (A) is preferably ethanol.

The amount of the metal compound (M) used in step (i) of the process of the invention is such that the reaction mixture of step (i) comprises advantageously at least 20% by weight, preferably at least 25% by weight, more preferably at least 30% by weight of said metal compound (M) based on the total weight of the metal compound (M) and the electrolyte solution (ES) in said mixture.

In one embodiment of the present invention, step (i) of the process is carried out in the presence of an aqueous medium [medium (A)] comprising, preferably consisting of, water and one or more alcohols.

The amount of medium (A) in the composition provided in step (i) of the process of the invention is not particularly critical.

In preferred embodiment, the amount of water in medium (A) is such to represent 8-10% by weight of the composition provided in step (i) of the process, while the amount of the one or more alcohols in medium (A) is such to represent 6-7% by weight of the composition provided in step (i) of the process.

In step (i) of the process of the invention, the hydrolysis and/or polycondensation of the metal compound (M) as defined above is usually carried out at room temperature or upon heating at temperatures lower than 100° C. Temperatures between 20° C. and 90° C., preferably between 20° C. and 70° C. will be preferred.

It is understood that, in this step (i) of the process of the invention, the hydrolysable groups Y of the metal compound (M) as defined above are partially hydrolysed and/or polycondensed in the presence of an aqueous medium so as to yield a pre-gelled metal compound comprising inorganic domains consisting of ≡A-O-A≡ bonds and one or more residual hydrolysable groups Y [compound (P-GM)].

In step (i) of the process of the present invention, the composition comprising the compound (P-GM) is conveniently prepared by adding into the reactor vessel, preferably in the order indicated here below, the following components as above defined:
  the electrolyte solution [solution (ES)],
  the metal compound [compound (M)],
  the at least one acid catalyst, and,
  optionally, the aqueous medium [medium (A)].

As this will be recognized by the skilled in the art, the hydrolysis and/or polycondensation reaction usually generates low molecular weight side products, which can be notably water or alcohol, as a function of the nature of the metal compound (M) as defined above.

The composition comprising the pre-gelled metal compound [compound (P-GM)] so obtained thus typically further comprises as low molecular weight side products one or more alcohols commonly generated by the hydrolysis and/or polycondensation of the metal compound (M) as defined above.

The electrolyte solution (ES) is typically prepared by dissolving a metal salt (S) in the liquid medium (L) so as to provide an electrolyte solution wherein the concentration of the salt is of advantageously at least 0.01 M, preferably at least 0.025 M, more preferably at least 0.05 M and of at most 1 M, preferably 0.75 M, more preferably 0.5 M.

In a second object, the present invention provides a composition comprising the pre-gelled metal compound [compound (P-GM)], said composition being obtained according to step (i) of the process as defined above.

In step (ii) of the process of the invention the compound (P-GM) is reacted in the molten state with a functional fluoropolymer [polymer (F)].

By the term "functional fluoropolymer [polymer (F)] comprising at least one hydroxyl group", it is hereby intended to denote a fluoropolymer comprising recurring units derived from at least one fluorinated monomer and at least one comonomer comprising at least one hydroxyl group [comonomer (MA)].

The term "at least one comonomer (MA)" is understood to mean that the polymer (F) may comprise recurring units derived from one or more than one comonomers (MA) as defined above. In the rest of the text, the expression "comonomer (MA)" is understood, for the purposes of the present invention, both in the plural and the singular, that is to say that they denote both one and more than one comonomers (MA) as defined above.

The comonomer (MA) may be selected from the group consisting of fluorinated monomers comprising at least one hydroxyl group and hydrogenated monomers comprising at least one hydroxyl group.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

By the term "fluorinated monomer", it is hereby intended to denote an ethylenically unsaturated monomer comprising at least one fluorine atom.

By the term "hydrogenated monomer", it is hereby intended to denote an ethylenically unsaturated monomer comprising at least one hydrogen atom and free from fluorine atoms.

The polymer (F) comprises preferably at least 0.01% by moles, more preferably at least 0.05% by moles, even more preferably at least 0.1% by moles of recurring units derived from at least one comonomer (MA) as defined above.

The polymer (F) comprises preferably at most 20% by moles, more preferably at most 15% by moles, even more preferably at most 10% by moles, most preferably at most 3% by moles of recurring units derived from at least one comonomer (MA) as defined above.

Determination of average mole percentage of comonomer (MA) recurring units in polymer (F) can be performed by any suitable method. Mention can be notably made of NMR methods.

The comonomer (MA) is typically selected from the group consisting of hydrogenated monomers comprising at least one hydroxyl group.

The comonomer (MA) is preferably selected from the group consisting of (meth)acrylic monomers of formula (I) or vinylether monomers of formula (II)

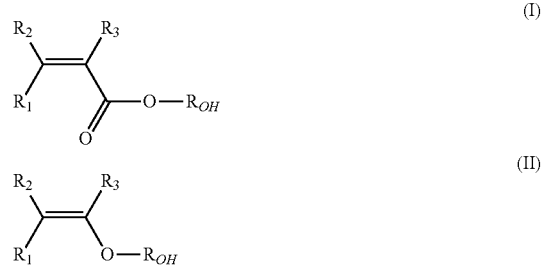

wherein each of $R_1$, $R_2$ and $R_3$, equal to or different from each other, is independently a hydrogen atom or a $C_1$-$C_3$ hydrocarbon group, and $R_{OH}$ is a hydrogen atom or a $C_1$-$C_5$ hydrocarbon moiety comprising at least one hydroxyl group.

The comonomer (MA) even more preferably complies with formula (I-A):

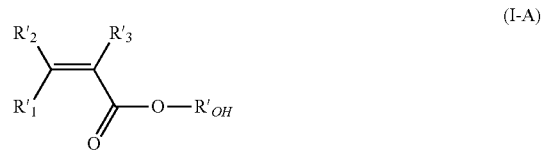

wherein $R'_1$, $R'_2$ and $R'_3$ are hydrogen atoms and $R'_{OH}$ is a $C_1$-$C_5$ hydrocarbon moiety comprising at least one hydroxyl group.

Non-limitative examples of suitable comonomers (MA) include, notably, hydroxyethyl (meth)acrylate, hydroxypropyl(meth)acrylate; hydroxyethylhexyl(meth)acrylates.

The comonomer (MA) is more preferably selected among the followings:

hydroxyethylacrylate (HEA) of formula:

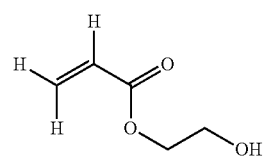

2-hydroxypropyl acrylate (HPA) of either of formulae:

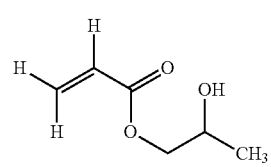

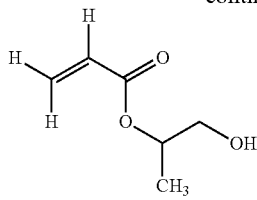

and mixtures thereof.

The comonomer (MA) is even more preferably HPA and/or HEA.

The polymer (F) may be amorphous or semi-crystalline.

The term "amorphous" is hereby intended to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

Polymer (F) has notably an intrinsic viscosity, measured at 25° C. in N,N-dimethylformamide, comprised between 0.03 and 0.20 l/g, preferably comprised between 0.03 and 0.15 l/g, more preferably comprised between 0.08 and 0.12 l/g.

Non limitative examples of suitable fluorinated monomers include, notably, the followings:
- $C_3$-$C_8$ perfluoroolefins, such as tetrafluoroethylene, and hexafluoropropene;
- $C_2$-$C_8$ hydrogenated fluoroolefins, such as vinylidene fluoride, vinyl fluoride, 1,2-difluoroethylene and trifluoroethylene;
- perfluoroalkylethylenes complying with formula $CH_2=CH-R_{f0}$, in which $R_{f0}$ is a $C_1$-$C_6$ perfluoroalkyl;
- chloro- and/or bromo- and/or iodo-$C_2$-$C_6$ fluoroolefins, like chlorotrifluoroethylene;
- (per)fluoroalkylvinylethers complying with formula $CF_2=CFOR_{f1}$ in which $R_{f1}$ is a $C_1$-$C_6$ fluoro- or perfluoroalkyl, e.g. $CF_3$, $O_2F_5$, $C_3F_7$;
- $CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;
- (per)fluoroalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per) fluorooxyalkyl having one or more ether groups, like $-C_2F_5-O-CF_3$;
- functional (per)fluoro-oxyalkylvinylethers complying with formula $CF_2=CFOY_0$, in which $Y_0$ is a $C_1$-$C_{12}$ alkyl or (per)fluoroalkyl, or a C1-012 oxyalkyl, or a $C_1$-$C_{12}$ (per)fluorooxyalkyl having one or more ether groups and $Y_0$ comprising a carboxylic or sulfonic acid group, in its acid, acid halide or salt form;
- fluorodioxoles, especially perfluorodioxoles.

Non limitative examples of suitable hydrogenated monomers include, notably, non-fluorinated monomers such as ethylene, propylene, vinyl monomers such as vinyl acetate, acrylic monomers, like methyl methacrylate, butyl acrylate, as well as styrene monomers, like styrene and p-methylstyrene.

The polymer (F) comprises preferably more than 25% by moles, preferably more than 30% by moles, more preferably more than 40% by moles of recurring units derived from at least one fluorinated monomer.

The polymer (F) comprises preferably more than 1% by moles, preferably more than 5% by moles, more preferably more than 10% by moles of recurring units derived from at least one hydrogenated monomer different from comonomer (MA).

The fluorinated monomer can further comprise one or more other halogen atoms (Cl, Br, I). Should the fluorinated monomer be free of hydrogen atoms, it is designated as per(halo)fluoromonomer. Should the fluorinated monomer comprise at least one hydrogen atom, it is designated as hydrogen-containing fluorinated monomer.

Should the fluorinated monomer be a hydrogen-containing fluorinated monomer, such as for instance vinylidene fluoride, trifluoroethylene, vinylfluoride, the hydrogen-containing fluoropolymer of the invention can be either a polymer comprising, in addition to recurring units derived from at least one comonomer (MA) as defined above, recurring units derived only from said hydrogen-containing fluorinated monomer, or it can be a copolymer comprising recurring units derived from at least one comonomer (MA) as defined above, said hydrogen-containing fluorinated monomer and from at least one other monomer.

Should the fluorinated monomer be a per(halo)fluoromonomer, such as for instance tetrafluoroethylene, chlorotrifluoroethylene, hexafluoropropylene, perfluoroalkylvinylethers, the hydrogen-containing fluoropolymer of the invention is a polymer comprising recurring units derived from at least one comonomer (MA) as defined above, recurring units derived from said per(halo)fluoromonomer and from at least one other hydrogenated monomer different from said comonomer (MA), such as for instance ethylene, propylene, vinylethers, acrylic monomers.

Preferred polymers (F) are those wherein the fluorinated monomer is chosen from the group consisting of vinylidene fluoride (VDF), tetrafluoroethylene (TFE), hexafluoropropene (HFP) and chlorotrifluoroethylene (CTFE).

Polymer (F) preferably comprise:
(a) at least 60% by moles, preferably at least 75% by moles, more preferably at least 85% by moles of vinylidene fluoride (VDF);
(b) optionally, from 0.1% to 15% by moles, preferably from 0.1% to 12% by moles, more preferably from 0.1% to 10% by moles of a fluorinated comonomer selected from chlorotrifluoroethylene (CTFE), hexafluoropropene (HFP), tetrafluoroethylene (TFE), trifluoroethylene (TrFE), perfluoromethylvinylether (PMVE) and mixtures therefrom; and
(c) from 0.05% to 10% by moles, preferably from 0.1% to 7.5% by moles, more preferably from 0.2% to 3.0% by moles of comonomer (MA) having formula (I) as defined above.

In step (ii) of the process of the invention, the functional fluoropolymer [polymer (F)] and the mixture comprising the pre-gelled metal compound [compound (P-GM)] are reacted in the molten state at temperatures typically between 100° C. and 300° C., preferably between 150° C. and 250° C., as a function of the melting point of the polymer (F).

It is understood that, in this step (ii) of the process of the invention, at least a fraction of the hydroxyl groups of the functional fluoropolymer [polymer (F)] and at least a fraction of the residual hydrolysable groups Y of the pre-gelled metal compound [compound (P-GM)] are reacted so as to yield a fluoropolymer hybrid composite consisting of organic domains consisting of chains of polymer (F) and inorganic domains consisting of ≡A-O-A≡ bonds, thus providing a polymer electrolyte comprising a fluoropolymer hybrid organic/inorganic composite already including the electrolyte solution (ES).

The fluoropolymer hybrid organic/inorganic composite comprised in the polymer electrolyte obtained from the process of the invention advantageously comprises from 0.01% to 60% by weight, preferably from 0.1% to 40% by weight of inorganic domains consisting of ≡A-O-A≡ bonds.

In step (ii) of the process of the invention, the polymer (F) and the composition comprising the pre-gelled metal compound [compound (P-GM)] are reacted in the molten state typically using melt-processing techniques.

Preferred melt-processing technique used in step (ii) of the process is extrusion at temperatures generally comprised between 100° C. and 300° C., preferably between 150° C. and 250° C.

The reaction in step (ii) of the process of the invention usually takes place in the twin screw extruder. Surplus reaction heat is commonly dissipated through the barrel wall.

The polymer (F) is preferably fed into the twin screw extruder in an amount comprised between 15% and 99.99% by weight, preferably between 20% and 50% by weight based on the total weight of said polymer (F) and said composition comprising the pre-gelled metal compound [compound (P-GM)].

The polymer electrolyte obtained by the process of the present invention can be conveniently processed into a membrane typically by extrusion or by compression moulding.

For the purpose of the present invention, the term "membrane" is intended to denote a discrete, generally thin, interface which moderates permeation of chemical species in contact with it. This interface may be homogeneous, that is, completely uniform in structure (dense membrane), or it may be chemically or physically heterogeneous, for example containing voids, pores or holes of finite dimensions (porous membrane).

In a third object, the present invention pertains to a process for the manufacture of a membrane for an electrochemical device comprising processing the polymer electrolyte obtained by the process of the invention through traditional compression moulding or extrusion techniques.

In one preferred embodiment of the present invention, step (ii) of the process is carried out in an extruder, and the polymer electrolyte obtained at the end of the reaction in molten state is directly processed into a membrane by film extrusion by using an extruder equipped with a flat die.

A further object of the present invention is thus a polymer electrolyte membrane which can be obtained by the processes as defined above.

The membranes of the present invention typically have a thickness comprised between 5 μm and 500 μm, preferably between 10 μm and 250 μm, more preferably between 15 μm and 50 μm.

The polymer electrolyte membrane of the invention can be advantageously used as polymer electrolyte separator in electrochemical and photo-electrochemical devices.

Non-limiting examples of suitable electrochemical devices include, notably, secondary batteries, especially Lithium-ion batteries and Lithium-Sulfur batteries, and capacitors, especially Lithium-ion capacitors.

The invention further pertains to a metal-ion secondary battery comprising as polymer electrolyte separator the polymer electrolyte membrane of the present invention as defined above.

The metal-ion secondary battery is generally formed by assembling a negative electrode (cathode), the polymer electrolyte membrane of the present invention as defined above and a positive electrode (anode).

The metal-ion secondary battery is preferably an alkaline or alkaline-earth secondary battery, more preferably a Lithium-ion secondary battery.

Non-limiting examples of suitable photo-electrochemical devices include, notably, dye-sensitized solar cells, photochromic devices and electrochromic devices.

Should the disclosure of any patents, patent applications, and publications which are incorporated herein by reference conflict with the description of the present application to the extent that it may render a term unclear, the present description shall take precedence.

The invention will be now described with reference to the following examples whose purpose is merely illustrative and not limitative of the present invention.

Raw Materials

Polymer FA: VDF/HEA copolymer comprising 0.7% by moles of hydroxyethyalcrylate (HEA)

Polymer FB: VDF/HEA (0.4% by moles)/HFP (2.5% by moles) copolymer having an intrinsic viscosity of 0.111/g in DMF at 25° C.

Tetraethylorthosilicate (TEOS) commercially available as liquid from Aldrich Chemistry purity >99%.

Lithium bis(trifluoromethanesulfonyl)imide (LiTFSI).

Ionic Liquid (IL): N-Propyl-N-methylpyrrolidinium bis(trifluoromethanesulfonyl)imide (Pyr13TFSI) of formula:

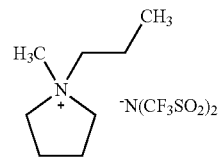

Citric acid: commercially available as crystals from Sigma Aldrich, purity 99%.

ES: 0.5 M of LiTFSI in Pyr13TFSI.

Measurement of the Ionic Conductivity (σ)

The polymer electrolyte membrane is placed in a ½ inch stainless steel Swagelok-cell prototype. The resistance of the polymer electrolyte membrane was measured at 25° C. and the ionic conductivity (a) was obtained using the following equation:

$$\sigma = \frac{d}{(R_b \times S)}$$

wherein d is the thickness of the film, Rb the bulk resistance and S is the area of the stainless steel electrode.

Determination of Intrinsic Viscosity of polymer (F) (DMF at 25° C.)

Intrinsic viscosity [η] (dl/g) was determined using the following equation on the basis of the dropping time, at 25° C., of a solution obtained by dissolving polymer (F) in dimethylformamide at a concentration of about 0.2 g/dl, in an Ubbelhode viscosimeter $$[\eta] = \frac{\eta_{sp} + \Gamma \cdot \ln \eta_r}{(1 + \Gamma) \cdot c}$$

where c is polymer concentration in g/dl;
  $\eta r$ is the relative viscosity, i.e. the ratio between the dropping time of sample solution and the dropping time of solvent; $\eta_{sp}$ is the specific viscosity, i.e. $\eta_r-1$; $\Gamma$ is an experimental factor, which for polymer (F) corresponds to 3.

Determination of $SiO_2$ Content in the Fluoropolymer Hybrid Organic/Inorganic Composite The amount of $SiO_2$ in the fluoropolymer hybrid organic/inorganic composite was measured by Energy Dispersive Spectroscopy (EDS) analysis of Silicon (Si) and Fluorine (F) elements on micrographs obtained from Scanning Electron Microscopy (SEM).

The $SiO_2$ content was determined by using the following equation (1):

$$SiO_2[\%] = [[SiO_2]/([SiO_2]+[F])] \times 100 \quad (1)$$

wherein $[SiO_2]$ and $[F]$ from equation (1) are calculated using the following equations (2) and (3), respectively:

$$[SiO_2] = ([Si_{EDS}] \times 60)/28 \quad (2)$$

$$[F] = ([F_{EDS}] \times 64)/38 \quad (3)$$

wherein:
  $Si_{EDS}$ and $F_{EDS}$ are the weight % of Si and F obtained by EDS,
  60 is the molecular weight of $SiO_2$,
  28 is the atomic weight of Si,
  64 is the molecular weight of $CH_2=CF_2$, and
  38 is the atomic weight of two F elements.

Determination of Morphology of Membranes by SEM-EDS

The morphology of the membrane specimens was studied using a LEO-1450VP Scanning Electron Microscope (beam voltage: 20 kV; working distance: 15 mm). Membrane specimens cross sections obtained from the fragile fracture in liquid nitrogen were pinned up on stabs with conductive adhesive tapes and sputtered with gold. An X-ray probe (INCA Energy Oxford, Cu-Kα X-ray source, k=1.540562 Å) was utilized to do the elemental analysis (EDS). The EDS analyses were performed with magnifications of 2500× on areas of about 20×20 $\mu m^2$.

Preparation of Polymer FA

In a 80 lt. reactor equipped with an impeller running at a speed of 300 rpm were introduced in sequence 48204 g of demineralised water and 20.2 g of METHOCEL® K100 GR suspending agent. The reactor was vented and pressurized with nitrogen to 1 bar, then 10.8 g of hydroxyethylacrylate (HEA) monomer and 127.7 g of diethylcarbonate (DEC) were introduced in the reactor, followed by 204 g of a 75% by weight solution of t-amyl perpivalate initiator in isododecane, and 25187 g of vinylidene fluoride (VDF) monomer. The reactor was then gradually heated to 52° C. to a final pressure of 110 bar. Temperature was maintained constant at 52° C. throughout the whole trial. Pressure was maintained constant at 110 bar throughout the whole trial by feeding a 19.9 WI aqueous solution of HEA monomer to a total of 16.5 kg and then the pressure started to decrease. The polymerization run was stopped by degassing the suspension until reaching atmospheric pressure. The polymer so obtained was then recovered, washed with demineralised water and oven-dried at 65° C. A conversion around 75% of the comonomers was obtained.

Preparation of Polymer FB

In a 80 liters reactor equipped with an impeller running at a speed of 250 rpm were introduced in sequence 50.2 kg of demineralised water and 3.80 g of METHOCEL® K100 GR and 15.21 g of Alkox® E45 as a couple of suspending agent. The reactor was purged with several sequences of vacuum (30 mmHg) and purged of nitrogen at 20° C. Then 187.3 g of a 75% by weight solution of t-amyl perpivalate initiator in isododecane. The speed of the stirring was increased at 300 rpm. Finally, 16.3 g of hydroxyethylacrylate (HEA) and 2555 g of hexafluoropropylene (HFP) monomers were introduced in the reactor, followed by 22.8 kg of vinylidene fluoride (VDF) were introduced in the reactor. The reactor was gradually heated until a set-point temperature at 55° C. and the pressure was fixed at 120 bar. The pressure was kept constantly equal to 120 bars by feeding 16.96 kg of aqueous solution containing a 188 g of HEA during the polymerization. After this feeding, no more aqueous solution was introduced and the pressure started to decrease. Then, the polymerization was stopped by degassing the reactor until reaching atmospheric pressure. A conversion around 81% of comonomers was obtained. The polymer so obtained was then recovered, washed with demineralised water and oven-dried at 65° C.

Example 1: Manufacture of the Polymer Electrolyte with Polymer FA

Step (i): Preparation of Pre-Gelled Metal Compound

In a 50 ml beaker equipped with a magnetic stirrer running at a moderated speed the following ingredients are introduced in sequence:
  ES: 13.68 g
  TEOS: 6.62 g
  water: 2.30 g (molar ratio TEOS:$H_2O$=1:4)
  ethanol: 1.66 g (weight ratio TEOS:EtOH=4:1)
  citric acid: 0.089 g (1 wt. % of TEOS+$H_2O$)

Theoretical amount of $SiO_2$ produced in each batch was 1.89 g (17.91% of the starting TEOS, water, ethanol components); the pre-gelled metal compound composition was maintained under vigorous stirring during all the process.

Step (ii) Preparation of Polymer Electrolyte Comprising a Fluoropolymer Hybrid Organic/Inorganic Composite:

The solution obtained in step (i) and polymer FA (8.4 g) were introduced into the feeding hopper of a mini-extruder and melt blended using a co-rotating twin screw micro extruder DSM Xplore 15 ml Microcompounder. The micro extruder is formed by a divisible fluid tight mixing compartment containing two detachable, conical mixing screws. Residence time was fixed at 2 minutes. The screw speed was fixed at 50 rpm for the feed and 100 rpm for the mixing, respectively. The heating temperature was set at 180° C. At the end of the 2 minutes of mixing the material was extruded through the nozzle.

The amounts of the components of the polymer electrolyte so obtained were as follows:
  $SiO_2$: 8% by weight;
  polymer FA: 35% by weight;
  ES: 57% by weight.

Example 2—Comparative—: Manufacture of Fluoropolymer Hybrid Organic/Inorganic Composite with Polymer FA A fluoropolymer hybrid organic/inorganic composite was prepared according to the process disclosed in WO 2014/067816, wherein polymer FA has been extruded and reacted with the metal compound in the absence of electrolyte solution, leading to a polymer FA/$SiO_2$ composite 75/25% by weight. The composite was obtained in the form of pellets. 10.08 g of said pellets were charged into the feeding hopper of a mini-extruder with 13.92 g of ES and kept at 180° C. After 2 minutes the product was discharged. The product resulting from extrusion had some transparent parts and some opaque parts. The extrudate did not show much consistency of the melt.

Example 3: Manufacture of the Polymer Electrolyte with Polymer FB

Step (i): Preparation of Pre-Gelled Metal Compound
Step (i) was carried out as described in example 1 above.
Step (ii) Preparation of Polymer Electrolyte Comprising a Fluoropolymer Hybrid Organic/Inorganic Composite:
Step (ii) was carried out in a twin screw co-rotating intermeshing extruder (Leistritz 18 ZSE 18 HP having a screw diameter D of 18 mm and a screw length of 720 mm (40 D)). The extruder was equipped with a main feeder a second feeder and a degassing unit. The barrel was composed of eight temperature controlled zones and a cooled one (at the main feeder) that allow to set the desired temperature profile. The molten polymer went out from a die, composed of a flat profile of 3 mm thick and 15 mm length. The extrudate was cooled in air.

The polymer FB was fed into the extruder from the main hopper.

Simultaneously, the pre-gel obtained in step (i) was fed into the extruder through the secondary hopper positioned in the block zone 3 (from 270 to 360 mm). The screw profile for this step was composed of a region of conveying elements with a regular decrease of pitch (from zone 0 to 1), then a kneading block composed by three kneading elements and a reverse flow element (zone 2), then a long conveying zone (from zone 3 to 4); after this series of elements, five kneading blocks (from zone 5 to 6). Finally five conveying elements and a degassing unit were situated before the die exit (zone 6 to 8). The temperature profile used is reported in Table 1 here below. The extruder rotation speed was 350 rpm.

TABLE 1

| | Zone | | | | | | | |
|---|---|---|---|---|---|---|---|---|
| | 1 | 2 | 3 | 4 | 5 | 6 | 7 | 8 |
| Profile [° C.] | 160 | 140 | 90 | 100 | 140 | 150 | 160 | 170 |

The material appear continuous, self-sustaining, with melt strength able to be pulled.

Example 4: Manufacture of the Polymer Electrolyte with Polymer FB

Step (i): Preparation of Pre-Gelled Metal Compound
In a 50 ml beaker equipped with a magnetic stirrer running at a moderated speed the following ingredients are introduced in sequence:
ES: 13.68 g
TEOS: 6.62 g
formic acid: 1.83 g (27 wt. % of TEOS)
the pre-gelled metal compound composition was maintained under vigorous stirring during all the process.
Step (ii) Preparation of Polymer Electrolyte Comprising a Fluoropolymer Hybrid Organic/Inorganic Composite:
Step (ii) was carried out as in step (ii) of example 3.
The amounts of the components of the polymer electrolyte so obtained were as follows:
$SiO_2$: 8% by weight;
polymer FB: 35% by weight;
ES: 57% by weight.

Example 5—Manufacture of a Membrane

The extrudates obtained from the process as detailed under Examples 1, 2, 3 and 4 were processed by compression moulding in a hot compression moulding press at 150° C. of heating temperature and 10 MPa of pressure for 3 min obtaining 60×60×0.2 $mm^3$ membrane specimens. Then the samples where maintained at 120° C. for 120 minutes as part of the post-treatment of the process.

Example 6—Elemental Analysis of the Samples Obtained in Example 5

In Table 2 the elemental analysis of the samples obtained in Example 5 are reported:

TABLE 2

| Element | Atomic % Theoretical | Example 1 | | | Example 2 comparative | Example 3 | | | | Example 4 |
|---|---|---|---|---|---|---|---|---|---|---|
| C | 40.6 | 42.23 | 43.44 | 43.18 | | 42.35 | 42.27 | 43.19 | 43.30 | 40.73 |
| O | 14.3 | 13.31 | 14.94 | 11.88 | 70.79 | 12.22 | 13.24 | 12.23 | 11.78 | 12.88 |
| F | 33.1 | 39.09 | 35.66 | 37.03 | | 40.99 | 36.63 | 39.75 | 40.62 | 39.88 |
| Si | 2.2 | 2.28 | 2.25 | 2.80 | 29.21 | 1.01 | 2.59 | 1.60 | 1.53 | 2.05 |
| S | 4.9 | 3.08 | 3.71 | 5.12 | | 3.43 | 5.26 | 3.23 | 2.76 | 4.35 |

The polymer electrolyte of the invention gives a rather uniform membrane.

The atomic elements in the membrane are well distributed in the film. On the contrary, the sample obtained with the extrudate of comparative example 2 shows areas where some of the elements are not even present.

Example 7—Ionic Conductivity of the Samples Obtained in Example 5

In Table 3 the ionic conductivity of the samples obtained in Example 5 is reported:

TABLE 3

| Example | Ionic conductivity (S/cm) at 25° C. |
|---|---|
| 1 | 5.11E−05 |
| 2 comparative | 3.10E−05 |
| 3 | 3.16E−04 |
| 4 | 2.72E−04 |

The polymer electrolytes according to the present invention show ionic conductivity that makes them suitable for use in battery applications, such as in separators in Li-ion batteries.

Example 8: Manufacture of Membrane of Polymer Electrolyte Film With Polymer FB by Film Extrusion Step (i): Preparation of Pre-Gelled Metal Compound Step (i) was carried out as described in example 1 above.
Step (ii) Preparation of Polymer Electrolyte Comprising a Fluoropolymer Hybrid Organic/Inorganic Composite:

Step (ii) was carried out as in example 3, but at the end of the reaction the molten polymer went out from a die, composed of a flat profile of 1 mm thick and 40 mm length. The extrudate film was stretched between two cylinders of diameter 100 mm and width 100 mm with a gap from 100-500 um. The extrudate was cooled in air.

Example 9: Manufacture of Membrane of Polymer Electrolyte Film With Polymer FB by Film Extrusion Step (i): Preparation of Pre-Gelled Metal Compound Step (i) was carried out as described in example 4 above.
Step (ii) Preparation of Polymer Electrolyte Comprising a Fluoropolymer Hybrid Organic/Inorganic Composite:

Step (ii) was carried out as described in example 8.

Example 10—Elemental Analysis of the Samples Obtained in Example 8 and 9

In Table 4 the elemental analysis of the samples obtained in Example 8 and 9 are reported:

TABLE 4

| Element | Atomic % Theoretical | Example 8 | Example 9 |
|---|---|---|---|
| C | 40.6 | 49.69 | 51.75 |
| O | 14.3 | 13.13 | 9.41 |
| F | 33.1 | 32.26 | 32.71 |
| Si | 2.2 | 3.53 | 2.30 |
| S | 4.9 | 4.39 | 3.83 |

The polymer electrolyte of the invention gives a rather uniform membrane. The atomic elements in the membrane are well distributed in the film.

Example 11 Ionic Conductivity of the Samples Obtained in Example 8 and 9

In Table 5 the ionic conductivity of the samples obtained in Example 8 and 9 is reported:

TABLE 5

| example | Ionic conductivity (S/cm) |
|---|---|
| 8 | 7.40E−05 |
| 9 | 4.36E−04 |

The polymer electrolytes membranes according to the present invention show ionic conductivity that makes them suitable for use in battery applications, such as in separators in Li-ion batteries.

The invention claimed is:

1. A process for manufacturing a polymer electrolyte based on a fluoropolymer hybrid organic/inorganic composite, said process comprising the following steps:
   (i) providing a composition comprising a pre-gelled metal compound [compound (P-GM)] obtained by partially hydrolysing and/or polycondensing a metal compound [compound (M)] having formula:

X4-mAYm wherein m is an integer from 1 to 4, A is a metal selected from the group consisting of Si, Ti and Zr, Y is a hydrolysable group selected from the group consisting of an alkoxy group, an acyloxy group and a hydroxyl group, X is a hydrocarbon group, optionally comprising one or more functional groups; in the presence of:
      an electrolyte solution [solution (ES)] comprising at least one metal salt [metal salt(S)] and a liquid medium [medium (L)];
      at least one acid catalyst; and
      optionally, an aqueous medium;
   said pre-gelled metal compound [compound (P-GM)] comprising one or more inorganic domains consisting of ≡A-O-A≡ bonds and one or more residual hydrolysable groups Y; and then
   (ii) reacting in the molten state at least a fraction of hydroxyl groups of a functional fluoropolymer comprising at least one hydroxyl group [polymer (F)] with at least a fraction of hydrolysable groups Y of said compound (P-GM), so as to obtain a polymer electrolyte comprising a fluoropolymer hybrid organic/inorganic composite incorporating the electrolyte solution (ES)
   wherein the polymer electrolyte has a uniform atomic element distribution having an incorporation of silicon of not more than 61% difference from the theoretical expected value, as measured by energy dispersive spectroscopy analysis by scanning electron microscopy according to $$SiO_2[\%]=[[SiO2]/([SiO2]+[F])]\times 100 \quad (1)$$

wherein [SiO2] and [F] from equation (1) are calculated using the following equations (2) and (3), respectively:

$$[SiO2]=([Si_{EDS}]\times 60)/28 \quad (2)$$

$$[F]=([FEDS]\times 64)/38 \quad (3)$$

wherein:
   $Si_{EDS}$ and $F_{EDS}$ are the weight % of Si and F obtained by EDS, 60 is the molecular weight of SiO2, 28 is the atomic weight of Si, 64 is the molecular weight of $CH_2=CF_2$, and 38 is the atomic weight of two F elements.

2. The process according to claim 1, wherein the compound (M) is a functional compound (M) selected from the group consisting of vinyltriethoxysilane, vinyltrimethoxysilane, vinyltrismethoxyethoxysilane of formula CH2=CHSi(OC2H4OCH3)3, 2-(3,4-epoxycyclohexylethyltrimethoxysilane) of formula:

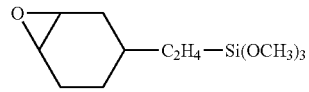

glycidoxypropylmethyldiethoxysilane of formula:

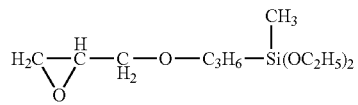

glycidoxypropyltrimethoxysilane of formula:

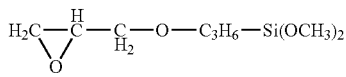

methacryloxypropyltrimethoxysilane of formula:

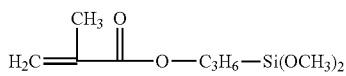

aminoethylaminpropylmethyldimethoxysilane of formula:

aminoethylaminpropyltrimethoxysilane of formula:

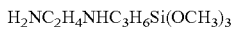

3-aminopropyl triethoxysilane, 3-phenylaminopropyl trimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldimethoxysilane, 3-(nallylamino) propyltrimethoxysilane, 2-(4-chlorosulfonyl phenyl)ethyltrimethoxysilane, carboxyethyl silanetriol, and its sodium salts, triethoxysilylpropylmaleamic acid of formula:

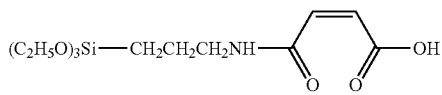

3-(trihydroxysilyl)-1-propane-sulphonic acid of formula HOSO2-CH2CH2CH2-Si(OH)3, N-(trimethoxysilylpropyl)ethylene-diamine triacetic acid, and its sodium salts, 3-(triethoxysilyl) propylsuccinic anhydride of formula:

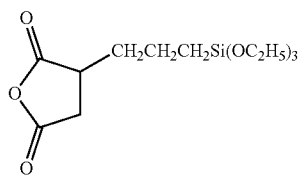

acetamidopropyltrimethoxysilane of formula H3C—C(O) NHCH2CH2CH2-Si(OCH3)3, alkanolamine titanates of formula Ti(A)X(OR)Y, wherein A is an amine-substituted alkoxy group, R is an alkyl group, and x and y are integers such that x+y=4.

3. The process according to claim 1, wherein the compound (M) is a non-functional compound (M) selected from the group consisting of: triethoxysilane, trimethoxysilane, tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

4. The process according to claim 1, wherein the at least one metal salt(S) is selected from the group consisting of: MeI, Me(PF6)n, Me(BF4)n, Me(ClO4)n, Me(bis(oxalato)borate)n ("Me(BOB)n"), MeCF3SO3, Me[N(CF3SO2)2] n, Me[N(C2F5SO2)2] n, Me[N(CF3SO2) (RFSO2)] n with RF being C2F5, C4F9, CF3OCF2CF2, Me(AsF6)n, Me[C (CF3SO2)3] n, Me2Sn, wherein Me is a metal and n is the valence of said metal.

5. The process according to claim 4, wherein the metal salt(S) is selected from the group consisting of LiI, LiPF6, LiBF4, LiClO4, lithium bis(oxalato)borate ("LiBOB"), LiCF3SO3, LiN(CF3SO2)2 ("LiTFSI"), LiN(C2F5SO2)2, M [N(CF3SO2) (RFSO2)] n with RF being C2F5, C4F9, CF3OCF2CF2, LiAsF6, LiC(CF3SO2)3, Li2Sn and combinations thereof.

6. The process according to claim 1, wherein the medium (L) in the electrolyte solution (ES) comprises at least one ionic liquid (IL), wherein the anion of the ionic liquid (IL) is selected from the group consisting of:

bis(trifluoromethylsulphonyl)imide of formula (SO2CF3) 2N—, hexafluorophosphate of formula PF6–, tetrafluoroborate of formula BF4–, and oxaloborate of formula:

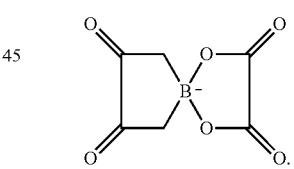

7. The process according to claim 1, wherein electrolyte solution (ES) consists of at least one ionic liquid (IL) and LiTFSI.

8. The process according to claim 1, wherein the acid catalyst is an organic acid.

9. The process according to claim 1, wherein the aqueous medium consists of water and ethanol.

10. The process according to claim 1, wherein under step (ii) the polymer (F) comprises comprising recurring units derived from at least one fluorinated monomer and recurring units derived from at least one comonomer comprising at least one hydroxyl group [comonomer (MA)] having formula (I):

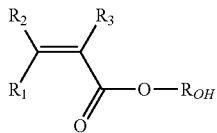 (I)

wherein each of R1, R2, R3, equal to or different from each other, is independently a hydrogen atom or a C1-C3 hydrocarbon group and ROH is a C1-C5 hydrocarbon moiety comprising at least one hydroxyl group.

11. The process according to claim 1, wherein under step (ii) the polymer (F) comprises:
  (a) at least 60% by moles of vinylidene fluoride (VDF);
  (b) optionally, from 0.1% to 15% by moles of a fluorinated comonomer selected from chlorotrifluoroethylene (CTFE), hexafluoropropene (HFP), tetrafluoroethylene (TFE), trifluoroethylene (TrFE), perfluoromethylvinylether (PMVE) and mixtures thereof; and
  (c) from 0.05% to 10% by moles of comonomer (MA) of formula (I) wherein each of R1, R2, R3, equal to or different from each other, is

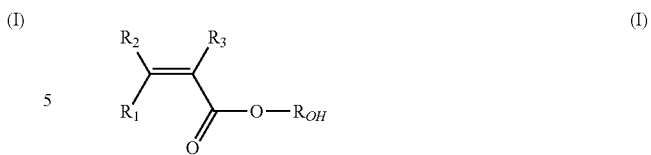 (I)

independently a hydrogen atom or a C1-C3 hydrocarbon group and ROH is a C1-C5 hydrocarbon moiety comprising at least one hydroxyl group.

12. A composition comprising the pre-gelled metal compound [compound (P-GM)], said composition being obtained according to step (i) of the process of claim 1.

13. A process for the manufacture of a polymer electrolyte membrane comprising processing into a film the polymer electrolyte obtained by the process according to claim 1 through compression moulding or extrusion techniques.

14. A polymer electrolyte membrane obtainable by the process according to claim 13.

15. An electrochemical device comprising the polymer electrolyte membrane according to claim 14.

16. The process according to claim 1, wherein the polymer electrolyte has an ionic conductivity of at least $5.11\times 10^{-5}$ S/cm.

* * * * *